S. W. JONES.
Corn Planter.
No. 82,531. Patented Sept. 29, 1868.
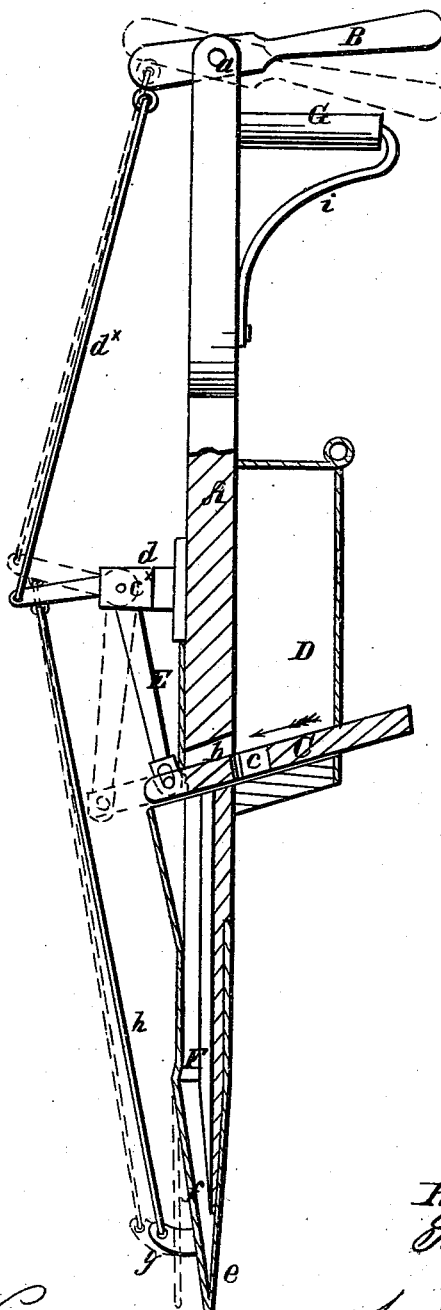

United States Patent Office.

SAMUEL W. JONES, OF BLUFFTON, INDIANA.

Letters Patent No. 82,531, dated September 29, 1868.

IMPROVEMENT IN CORN-PLANTERS.

*The Schedule referred to in these Letters Patent and making part of the same.*

TO ALL WHOM IT MAY CONCERN:

Be it known that I, SAMUEL W. JONES, of Bluffton, in the county of Wells, and State of Indiana, have invented a new and useful Improvement in Corn-Planters; and I do hereby declare that the following is a full, clear, and exact description thereof, which will enable others skilled in the art to make and use the same, reference being had to the accompanying drawings, forming part of this specification, in which—

The drawing represents a side sectional view of my invention.

Similar letters of reference indicate like parts.

This invention relates to a new and useful improvement in that class of corn-planters which are operated by hand.

It consists in a peculiar construction of the planter, as hereinafter fully shown and described, whereby it may be operated with the greatest facility, and a very simple and efficient implement obtained.

A represents the staff of the machine, in the top of which a lever, B, is secured by a pivot, $a$.

In the staff A, some distance below its centre, there is made a mortise, $b$, in which a slide, C, is fitted and works, said side being slightly inclined, and having a hole, $c$, made through it.

The slide C works through the hopper or seed-box D, and rests upon the bottom of the same, as clearly shown in the drawing.

The hopper or seed-box is attached to the staff A, and the end of the slide C, which projects through the mortise $b$, is pivoted to the lower end of a bent lever, E, the fulcrum-pin, $c^\times$, of which passes through a bracket or arm, $d$, attached to the staff.

The outer end of the upper arm of the lever E is connected by a rod, $d^\times$, with lever B.

The lower end of the staff A, at one side, is shod with a metal plate, $e$, which extends a short distance below the staff, and the opposite side has a sheet-metal case, F, attached to it, which serves as a seed-conducting spout.

The lower part, $f$, of this spout is a spring, and its lower edge is kept in contact with plate $e$ by its elasticity. This part $f$ is provided with an arm, $g$, which is connected by a rod, $h$, with the upper arm of lever E.

G is a handle, attached to one side of the upper part of the staff A, and braced by a rod, $i$.

The operation is as follows:

The seed-box D is supplied with seed, (corn,) and the operator carries the device in his hand, and inserts its lower end in the ground where a dropping is to be made. The lever B is then pressed down toward the handle G, and the bent lever E is actuated, the latter moving the slide in the direction indicated by the arrow, so that the hole $c$, which is filled with seed, will be brought within the spout F, and the seed in hole $c$ discharged into said spout. Simultaneously with this movement of the slide, the lower spring or elastic part $f$ of the spout F is drawn outward, and the seed drops into the earth. The lever B is then relieved of pressure, and the lower end of $f$ closes against the lower end of $e$, by virtue of its own elasticity, and the slide C moved back to its original position to be refilled with seed. The lower end of the staff is then again inserted in the earth, where a succeeding dropping is to be made and the operation repeated.

Having thus described my invention, I claim as new, and desire to secure by Letters Patent—

The slide C, fitted in the seed-box or hopper D, and passing through the staff A, in combination with the bent lever E, connected with the slide C, the lever B, and the lower spring or elastic part $f$ of the spout F, all arranged to operate substantially as and for the purpose herein shown and described.

SAMUEL W. JONES.

Witnesses:
A. W. LIVINGSTONE,
WM. E. KINERT.